Nov. 22, 1932. P. B. BEKEART 1,888,304
CONTAINER FOR FLY HOOKS AND PLAIN HOOKS
Filed Nov. 5, 1928

Philip B. Bekeart INVENTOR.

BY
ATTORNEY.

Patented Nov. 22, 1932

1,888,304

UNITED STATES PATENT OFFICE

PHILIP BALDWIN BEKEART, OF SAN FRANCISCO, CALIFORNIA

CONTAINER FOR FLY HOOKS AND PLAIN HOOKS

Application filed November 5, 1928. Serial No. 317,303.

This invention relates particularly to a box or container for holding fly hooks and plain hooks in such a manner that the same are readily accessible to be used.

An object of the invention is to provide a hollow container having guides in the interior thereof within which a hook supporting element is slidably confined so that it may be quickly and easily withdrawn from the container or dropped into the container.

A still further object of the invention is to provide a container for fly hooks and plain hooks consisting of a box-like structure having one or more pairs of guides arranged at corresponding points on opposite sides of the container, each pair of aligned guides being adapted to receive therebetween a relatively stiff card or sheet provided with lengths of chenille or similar material thereon, and on which the fly hooks and plain hooks are mounted and held.

Another object of the invention is to make the fly and hook holders in the form of a fly book wherein each of the cards or sheets functioning as the fly or hook holders become a leaf or leaves, in what is commonly known as a fly book or hook book.

Other objects of the invention are to provide a carrying element for fly hooks and plain hooks consisting of a series of lengths of chenille mounted in a relatively close position to the surface of a card, whereby the hooks can be confined between the chenille and the surface of the card, and where the hooks are equipped with gut snells, I provide means on the card for engaging said snells to prevent the same from becoming entangled, said means consisting of a coil spring having each winding of the coil provided with one or more lateral offsets or bows therein so that throughout the length of the winding of the spring all of the offsets or bows lie in nested relation to form shoulders from which the snells cannot disengage when subjected to a shaking movement.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawing:

Fig. 6 is a front view of the snell holding spring.

Figure 1:
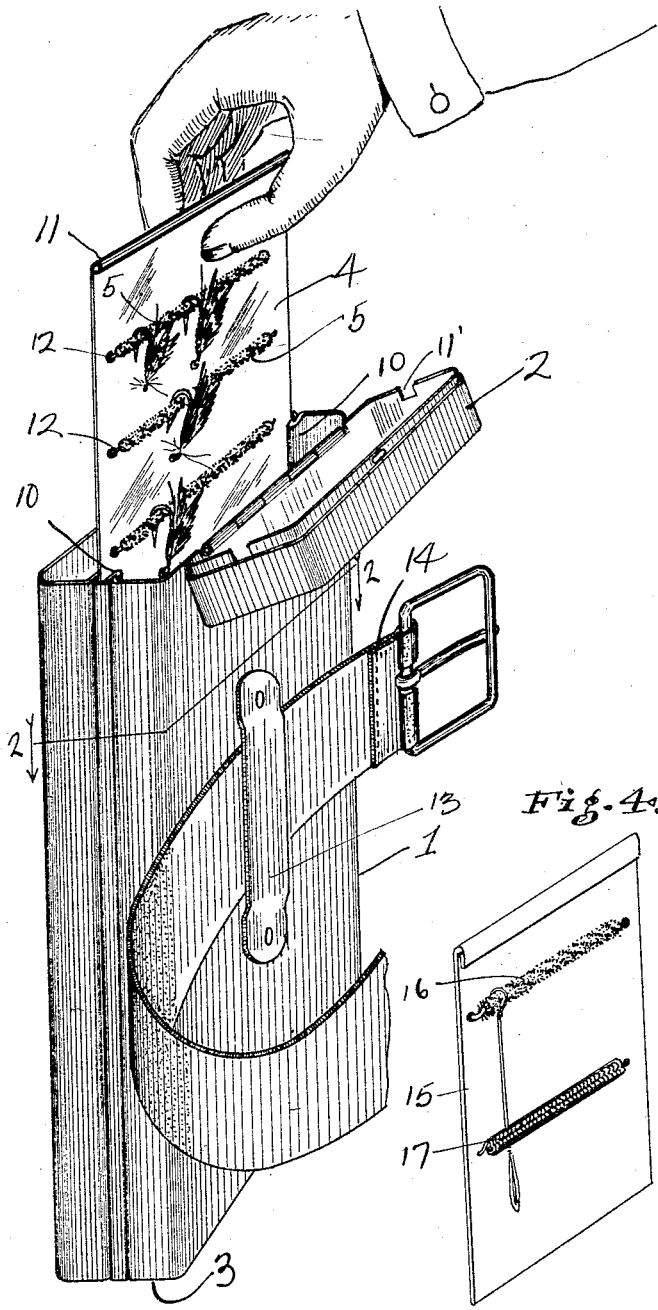
Fig. 1 represents a perspective view of a fly hook and plain hook container showing the cover of the box open to expose the hook carrying element which is shown partially out of the container to illustrate the manner in which the hooks are carried on said element.
Figure 5:
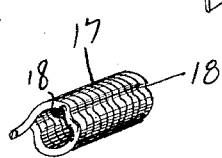
Fig. 5 is a perspective view of a spring for holding the hook snells.
Figure 2:
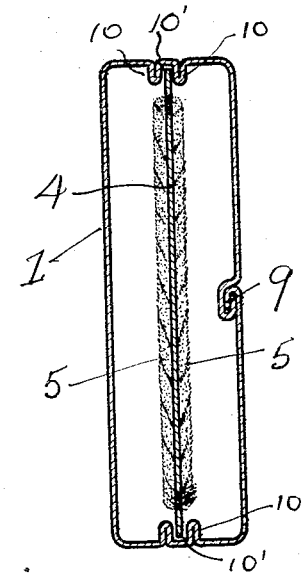
Fig. 2 is a cross section taken through Fig. 1, on the line 2—2.

In detail the construction illustrated in the drawing, comprises a rectangular housing or box 1, consisting of two long and two short sides, an open end closed by a cover 2, hinged along one side thereof to the box 1, and a bottom end closed by a plate 3. The box is preferably formed out of a single sheet of light gauge and light weight metal, the same being bent to form the two long and two short sides of the box, and the ends of the sheet are held together by bending portions of the metal outward along the longitudinal edges to form flanges, one of which is made longer than the other. The longer flange is then bent down over the shorter and the interlocked flanges thus formed are bent down upon themselves to form a "locked seam" or rib 9 on the interior of the container. Each of the shorter sides of the box are provided with a pair of longitudinally extended ribs 10 forming a channel 10′ between each pair of guides. The ribs 10 are shown as being pressed inwardly out of the material out of which the box is formed, although it is to be understood said ribs might be formed as independent members and secured in the desired position in the box by welding or by riveting or otherwise.

I have described the box thus far as being formed of sheet metal, although obviously it would be within the purview of the invention to form the same out of wood, celluloid, or other materials capable of being built into and of holding any selected shape.

In the drawing I have shown the box 1 as being provided with but a single pair of guides 10', whereby a single hook supporting element can be positioned within the box, although the invention contemplates that more than one guideway can be provided to accommodate a plurality of hook supporting cards or sheets.

The guideways 10' are adapted to receive therebetween a card or sheet 4, which is substantially the same width as the box between the guideways, whereby the said sheet 4 may be slipped into the box or extracted therefrom through the open end thereof, normally closed by the cover 2. The sheet 4 has the upper end thereof rolled as at 11, to form a finger grip for moving the card into or out of the box. The inside of the cover 2 is cut away as at 11' at corresponding points on opposite sides thereof, to form an opening that will pass over the upper end of the sheet 4 and the guides 10 when the cover is in the closed position. The sheet 4 is provided with a series of rows of chenille 5, arranged either on one side or on both sides of the said sheet. The chenille may be cut into lengths shorter than the width of the sheet 4 whereby the ends of each length of chenille may be secured to openings provided through the sheet 4, or the length of chenille may be longer so as to extend across one face of the sheet 4, then through the said sheet 4 and back across the opposite surface of the sheet 4, whereby both ends of said chenille may be attached to the same opening in the sheet 4 as shown at 12. The chenille, when attached to the sheet 4 lies parallel to the surface thereof and in approximate contact therewith. The chenille that I contemplate using is similar to the chenille used for "pipe-cleaning" purposes, although it is to be understood that my invention contemplates any type of strand like material similar to chenille that may or may not have a thread or wire center, with wire or fabric strands extended radially outward from the center, completely around the said center and throughout the length thereof. The diameter of the chenille used, together with the manner in which the lengths of chenille are spaced from each other in the container, and relative to the surface of the sheet on which the chenille is attached, will vary with the different sizes of fly hooks and fish hooks to be held or carried thereon. The chenille lies so closely to the surface on which it is mounted that only a very slight action is necessary to engage or disengage the fly or a hook therewith or therefrom. The barb of the hook lies meshed with the radial strands on the chenille which offer sufficient resistance to prevent the hook from becoming disarranged, yet not offering any resistance to the removal of the hook from the chenille which might tend to dull or damage the hook or the barb thereon.

The box 1 may or may not be provided with a strap clamp 13 thereon through which a strap 14 passes, thus providing a simple means by which the box 1 may be carried by the user thereof, said strap 14 in actual practice being the belt that passes around the trousers of the user carrying the box.

Figure 4:
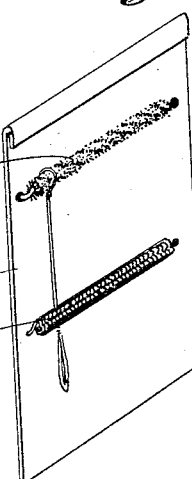
Fig. 4 is a perspective view of a plain or fly hook carrying card having a spring thereon to hold the snells.
Figure 3:
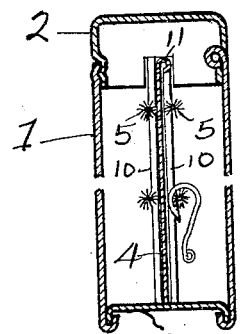
Fig. 3 is a vertical section through the container showing the cover of the box in the closed position.

In the modified form of the hook supporting holder shown in Fig. 4, I provide a substantially rectangular card holder or sheet 15 adapted to fit into the guides in the box 1. One or more lengths of chenille 16 are mounted on the surface of the sheet 15 and with which fly hooks or plain hooks may be engaged in the manner heretofore described. A coil spring 17 is also secured to the holder 15 in spaced relation to the chenille 16, to hold the gut snells attached to each hook, to prevent said gut snells from becoming entangled. This coil spring 17 has each winding thereof provided with one or more lateral offsets or bows 18 therein so that throughout the length of the spring mounting all of the offsets or bows lie in nested relation to form a shoulder behind which the snells can be held to prevent their working loose from the spring 17. Where the spring would not be provided with the shoulders 18, no resistance would be offered the snells confined therebetween to hold said snells in place, but with the addition of the shoulders on the coil spring, the snells will be held in confinement therebetween until sufficient effort is placed on the snells to overcome the tension of the spring sufficiently to allow the snells to pass out through a pair of nested shoulders. The use of this particular coil spring in combination with the chenille hook holder, is desirable in many cases where my hook holding invention is being used.

The invention also contemplates that the cards or sheets 15 which are the holding means for the hooks, may be incorporated into a book as the leaf or leaves thereof, where it would be found to better advantage to arrange the holder in book form rather than in the form of a box container as heretofore described.

Having thus described this invention, what I claim and desire to secure by Letters Patent is:

1. A spring for holding fish hook snells comprising a series of windings, each winding being provided with a lateral bow and all of the bowed windings lying in nested relation.

2. A container for a fly hook carrying sheet, comprising a single sheet of material bent to form a rigid box of substantially rectangular cross section with an open top; means formed on the longitudinal edges of the material to join in a locked seam on the interior of the box; and a pair of longitudinal ribs on the inside of each of two opposed box sides to form aligned guides for the edges of said sheet.

3. A container for a fly hook carrying sheet comprising a single sheet of material bent to form a rigid box of substantially rectangular cross section with an open top; means formed on the longitudinal edges of the material to join in a locked seam on the interior of the box; and a pair of longitudinal ribs pressed inwardly out of the box material on each of two opposed sides of the box to form aligned guides for the edges of said sheet.

4. A carrier for fly hooks and the like comprising a sheet having laterally aligned openings thereon; a single length of chenille extended through the laterally aligned openings from one face of the sheet to the other and secured in place to form a hook support on each face of the sheet.

In testimony whereof, I have hereunto set my hand at San Francisco, California, this 9th day of October, 1928.

PHILIP BALDWIN BEKEART.